US008689703B2

(12) United States Patent
Harada et al.

(10) Patent No.: US 8,689,703 B2
(45) Date of Patent: Apr. 8, 2014

(54) METHOD FOR WELD-JOINING ATTACHMENT TO OUTER PANEL OF RAILWAY VEHICLE AND CAR BODY SIDE STRUCTURE PRODUCED BY THE SAME

(75) Inventors: Hiroji Harada, Higashi-Osaka (JP); Yoshinori Kono, Higashi-Osaka (JP); Tomonori Sumikawa, Higashi-Osaka (JP); Hiroshi Yonetani, Higashi-Osaka (JP); Yasuhiro Tanaka, Higashi-Osaka (JP); Eiichi Kato, Higashi-Osaka (JP)

(73) Assignee: The Kinki Sharyo Co., Ltd., Osaka (JP)

( * ) Notice: Subject to any disclaimer, the term of this patent is extended or adjusted under 35 U.S.C. 154(b) by 598 days.

(21) Appl. No.: 12/516,600

(22) PCT Filed: Nov. 30, 2006

(86) PCT No.: PCT/JP2006/323984
§ 371 (c)(1),
(2), (4) Date: May 28, 2009

(87) PCT Pub. No.: WO2008/068808
PCT Pub. Date: Jun. 12, 2008

(65) Prior Publication Data
US 2010/0077935 A1     Apr. 1, 2010

(51) Int. Cl.
*B61D 17/00*     (2006.01)
*A47J 36/02*     (2006.01)

(52) U.S. Cl.
USPC .......................................... 105/401; 228/101

(58) Field of Classification Search
USPC .......... 105/396, 397, 399, 400, 401; 228/101, 228/141.1, 143, 144
See application file for complete search history.

(56) References Cited

U.S. PATENT DOCUMENTS

| | | | | |
|---|---|---|---|---|
| 6,092,473 A | * | 7/2000 | Altenburg et al. | 105/404 |
| 6,196,136 B1 | * | 3/2001 | Yoshizaki et al. | 105/396 |
| 6,378,444 B1 | * | 4/2002 | Dastas et al. | 105/396 |
| 6,394,334 B1 | * | 5/2002 | Brouillette et al. | 228/33 |
| 6,394,335 B2 | * | 5/2002 | Meier et al. | 228/144 |
| 7,677,846 B2 | * | 3/2010 | VanderPol et al. | 409/132 |
| 2007/0214998 A1 | | 9/2007 | Komaki et al. | |

FOREIGN PATENT DOCUMENTS

JP     59-29355     2/1984
(Continued)

OTHER PUBLICATIONS

English language Abstract of JP 2006-341300, Dec. 21, 2006.
(Continued)

*Primary Examiner* — R. J. McCarry, Jr.
(74) *Attorney, Agent, or Firm* — Greenblum & Bernstein P.L.C.

(57) ABSTRACT

A weld-joining structure between an outer panel and an attachment is achieved, which is advantageous in terms of appearance, workability, and cost. To weld-join the outer panel and the attachments including, such as frame members and opening frames and opening frame members, which is a reinforcement or an interior or exterior member for use in the outer panel, the outer panel and the attachment placed on the outer panel are weld-joined by laser welding at overlapping portions of the outer panel and the attachment. The laser welding is performed along a polishing mark formed in one direction on an externally exposed-side surface of the outer panel and the attachment.

16 Claims, 7 Drawing Sheets

(56) References Cited

FOREIGN PATENT DOCUMENTS

| | | |
|---|---|---|
| JP | 63-9481 | 3/1988 |
| JP | 5-262228 | 10/1993 |
| JP | 9-30414 | 2/1997 |
| JP | 2843899 | 10/1998 |
| JP | 11-278258 | 10/1999 |
| JP | 2002-103074 | 4/2002 |
| JP | 2003-311443 | 11/2003 |
| JP | 2005-329412 | 12/2005 |
| JP | 2006-27366 | 2/2006 |
| JP | 2006-341300 | 12/2006 |
| WO | 2005/110663 | 11/2005 |

OTHER PUBLICATIONS

English language Abstract of JP 2006-27366, Feb. 2, 2006.
English language Abstract of JP 2005-329412, Dec. 2, 2005.
English language Abstract of JP 2003-311443, Nov. 5, 2003.
English language Abstract of JP 2002-103074, Apr. 9, 2002.
English language Abstract of JP 11-278258, Oct. 12, 1999.
English language Abstract of JP 9-30414, Feb. 4, 1997.
English language Abstract of JP 5-262228, Oct. 10, 1993.
English language Abstract of JP 7-284932, Oct. 31, 1995.
U.S. Appl. No. 12/516,673 to Kono et al., which was filed May 28, 2009.
U.S. Appl. No. 12/516,597 to Harada et al., which was filed May 28, 2009.

* cited by examiner

Prior Art

Fig. 6A        Fig. 6B

Prior Art

METHOD FOR WELD-JOINING ATTACHMENT TO OUTER PANEL OF RAILWAY VEHICLE AND CAR BODY SIDE STRUCTURE PRODUCED BY THE SAME

TECHNICAL FIELD

The present invention relates to a method for weld-joining an attachment to an outer panel of a railway vehicle. In particular, the invention relates to a method for weld-joining an attachment to an outer panel of a railway vehicle, the method being carried out such that the attachment, such as a frame member, an opening frame, and an opening frame member, which is a reinforcement or an interior or exterior member for use in the outer panel, is weld-joined to the outer panel. The invention also relates to a car body side structure produced by the method.

BACKGROUND ART

Figure 6A:
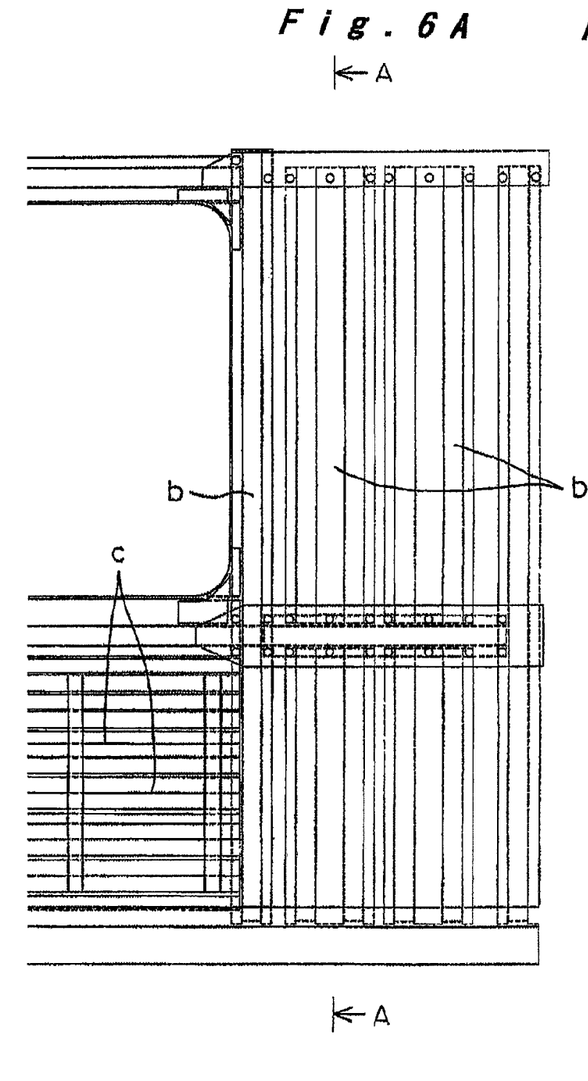
FIGS. 6A and 6B show an example of the joining structure between an outer panel, vertically and horizontally arranged frame members, opening frames, and opening frame members, the joining structure being used in a conventional car body side structure of a railway vehicle, FIG. 6A being a front view from the inner side, FIG. 6B being a cross-sectional view taken along line A-A in FIG. 6A.
Figure 6B:
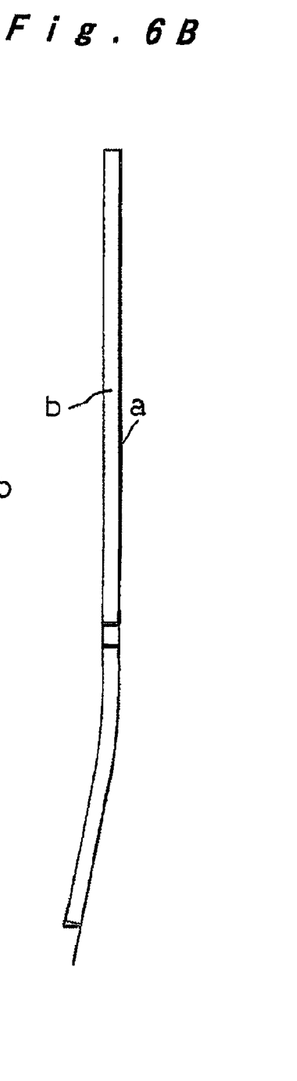
Figure 7A:
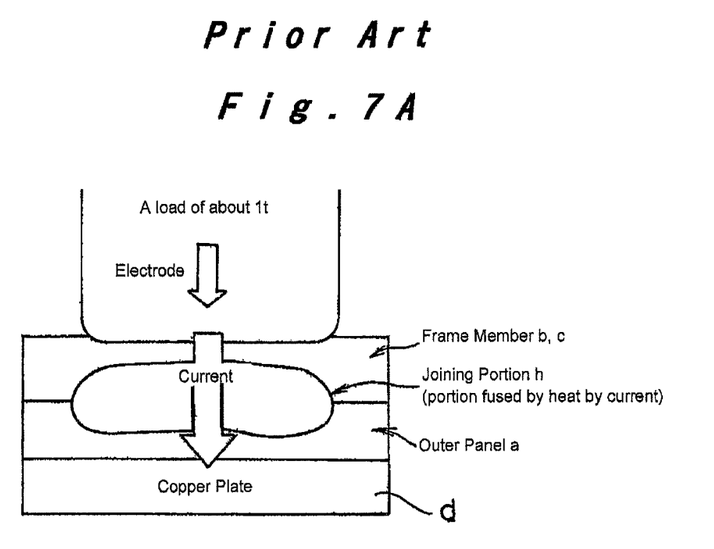
FIGS. 7A and 7B are cross-sectional views illustrating weld-joined conditions of spot welding and laser welding.

In one known structure for reinforcing an outer panel of a railway vehicle, vertically and horizontally arranged frame members are placed on and weld-joined to the interior surface of the outer panel to reinforce the outer panel (see, for example, Patent Document 1). In another exemplary structure, vertical and horizontal frame members b and c are disposed on and weld-joined to an outer panel a, as shown in FIGS. 6A and 6B. In these structures, spot welding shown in FIG. 7A is used for weld-joining. However, since a load of 1 t is applied during the spot welding process, indentations are formed on the exterior surface, resulting in the deterioration of the appearance. In addition, much time and labor are required for joining, and the cost increases. Since a large load is applied, a large apparatus is required, and an expensive copper-made electrode plate d must be used, so that the cost for the equipment is high.

Figure 7B:
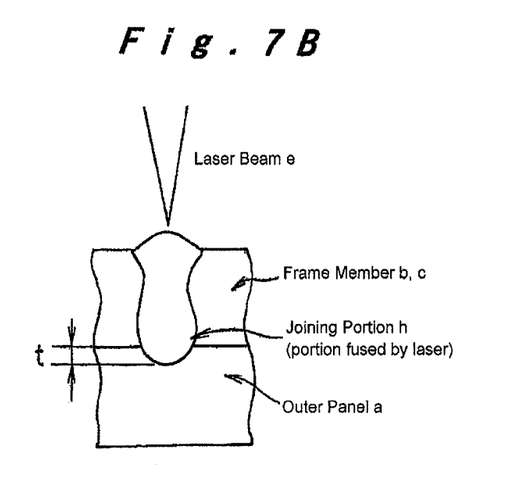

In view of the above, in one known method, laser welding shown in FIG. 7B is used for weld-joining (see, for example, Patent Document 2).

[Patent Document 1] Japanese Patent Application Laid-Open No. Hei. 9-30414.

[Patent Document 2] Japanese Patent No. 2843899.

DISCLOSURE OF THE INVENTION

Problems to be Solved by the Invention

Figure 5:
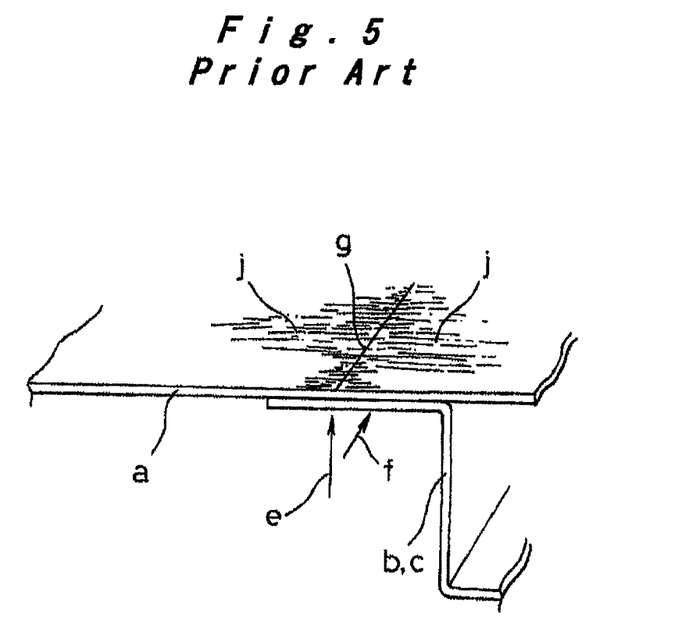
FIG. 5 is a perspective view illustrating an example of the condition of a weld-joining portion between an outer panel and a frame member weld-joined by conventional laser welding.

The present inventor has conducted various experiments and studies on weld-joining of attachments to the outer panels of stainless steel-made vehicles by means of laser welding. The inventor has noticed that, when frame members b and c are placed on the interior surface of an outer panel a and laser-welded thereto in a direction shown by an arrow f with a laser beam e directed from the interior side as shown in FIG. 5, a linear mark g along the laser welding line is formed on the exterior surface of the outer panel a in some cases. This is because, with laser welding, the penetration depth of a fused portion serving as a joining portion h is small in the outer panel a, as shown in FIG. 7B. Therefore, a strong force is exerted on the frame member b and c side during solidification, so that the outer panel a having a thickness of about 1.5 to 3 mm and the frame members b and c having a thickness of about 1 to 2.5 mm are slightly bent along the laser welding line. The linear mark g was less noticeable on mirror surfaces but was more noticeable on surfaces having polishing marks j, which are a type of decorative marks provided to make flaws and stains less noticeable as shown in FIG. 5, in specific cases.

The inventors have found that, in the above specific cases, the laser welding line intersects the polishing marks j, and that the linear mark g is totally unnoticeable when laser welding is performed such that the laser welding line is along the polishing marks j. A similar tendency may be observed in other metal plates such as aluminum plates.

In the structure described in Patent Document 1, since the vertical and horizontal frame members are laser welded to the outer panel, the formation of the linear mark g on the decorative surface can not be avoided. In addition, the horizontal frame members are divided by the vertical frame members, so that the welding cannot be performed in a continuous manner. In view of the above, the present inventor has completed an inventive method for weld-joining attachments to an outer panel of a railway vehicle, in which the outer panel having polishing marks formed in a specific direction is used. The present inventor has also completed a car body side structure produced by the method. The method and the car body side structure are advantageous in terms of appearance, workability, and cost.

It is an object of the present invention to provide a method for weld-joining attachments to an outer panel of a railway vehicle, which is advantageous in terms of appearance, workability, and cost, and to provide a car body side structure produced by the same, which are obtained as a result of vigorous efforts of the inventor.

Means for Solving the Problems

To achieve the above object, the present invention provides a method for weld-joining an attachment to an outer panel of a railway vehicle, in which the attachment, such as a frame member, an opening frame, and an opening frame member, which is a reinforcement or an interior or exterior member for use in the outer panel, is weld-joined to the outer panel. The method is mainly characterized by laser welding, at an overlapping portion of the outer panel and the attachment placed on the outer panel, the outer panel and the attachment along a polishing mark formed in one direction on an externally exposed-side surface of the outer panel and the attachment to weld-join the outer panel and the attachment.

In the above configuration, for example, the frame member that is one of the attachments is placed on the interior surface of the outer panel and weld-joined such that the outer panel is disposed on the exterior side. Furthermore, the opening frame and the opening frame member that are ones of the attachments are placed on the exterior surface of the outer panel and weld-joined such that the opening frames and the opening frame members are disposed on the exterior side. In this case, when the attachments are placed on and weld-joined to the outer panel at their overlapping portions by laser welding from the interior side, the laser welding is performed along the polishing marks formed on the exterior-side surfaces of the outer panel and the attachments. Therefore, the formation of noticeable linear marks in the laser welding direction on the exterior surfaces can be avoided, and laser welding for weld-joining the attachments to the outer panel can be put to practical use. As described above, the attachments are weld-joined to the outer panel at the overlapping portions by laser welding from the interior side, and the laser welding is performed along the polishing marks formed on the exterior-side surfaces of the outer panel and the attachments, so that the formation of noticeable linear marks in the laser welding direction on the exterior surfaces can be avoided. Since the laser welding can be performed without deterioration of appearance, the workability is improved accordingly, and the cost is also reduced.

In another configuration, the polishing mark on the outer panel is formed in a lengthwise direction of the vehicle, and the frame member is horizontally placed on an interior surface of the outer panel. The outer panel and the frame member are weld-joined by laser welding performed in a lengthwise direction of the frame member. Since the direction of the polishing mark on the outer panel is set to the lengthwise direction of the vehicle, a large number of long horizontal frame members that can be continuously laser welded can be used. This contributes to the required car body strength. In this manner, the ratio of the number of long horizontal frame members can be increased, and the ratio of the continuously laser welded portions along the horizontal frame members can thereby be increased. This is further advantageous in terms of workability and cost reduction and contributes to the required car body strength.

In another configuration, the frame member is vertically placed on the interior surface of the outer panel, and the outer panel and the frame member are weld-joined by spot welding. Linear marks are formed when laser welding is performed along the vertical frame member. Since spot welding is used to weld-join the vertical frame member to the outer panel having the polishing mark formed in the lengthwise direction of the vehicle, the formation of noticeable linear marks intersecting the polishing mark can be avoided. In this manner, the number of the vertical frame members can be reduced by an amount that corresponds to the increase in the number of the horizontal frame members. Even in such a case, the required car body strength can be ensured.

In another configuration, the vertical frame member and the horizontal frame member are weld-joined together by any of plug welding, spot welding, and laser welding. Since any suitable one of various welding methods can be used, the vertical and horizontal frame members can be weld-joined together without affecting the outer panel and the appearance, and the joint strength between the vertical and horizontal frame members can be improved.

With the above method for weld-joining an attachment to an outer panel of a railway vehicle, a car body side structure of a railway vehicle having the following characteristic configuration is provided while the advantageous features of the above methods are effectively utilized. The outer panel having a polishing mark formed in the lengthwise direction of the vehicle and a frame member horizontally placed on the interior surface of the outer panel are joined at a weld-joining portion welded by laser welding performed in the lengthwise direction of the horizontal frame member. The outer panel and a frame member vertically placed on the interior surface of the outer panel are joined at a weld-joining portion welded by spot welding. An opening frame or an opening frame member having a lengthwise polishing mark formed on an exterior surface thereof is placed on an exterior surface of an opening edge of the outer panel. The opening frame or the opening frame member is joined to the outer panel at a weld-joining portion welded by laser welding performed in the lengthwise direction of the opening frame or the opening frame member.

In another configuration, the outer panel includes an opening for a window and an opening for an entrance door. The horizontal frame members are disposed at substantially regular vertical intervals on the interior surface of the outer panel except for the openings for the window and the entrance door. The vertical frame members are disposed along side portions of the openings for the window and the entrance door and along an end portion of the outer panel. Between the vertical frame members, a vertical reinforcing member is placed on the horizontal frame members from an interior side so as to extend therebetween and is joined thereto at weld-joining portions welded by any of plug welding, spot welding, and laser welding. In this case, in areas where the horizontal frame members can be disposed, a higher priority is given to the horizontal frame members than to the vertical frame members so that the number of the horizontal frame members disposed in those areas is greater than the number of the vertical frame members. In this manner, the horizontal frame members are prevented from being divided by the vertical frame members, and the continuity of laser welding is maintained. Therefore, the required car body strength can be ensured by the vertical frame members significantly reduced in their number and by the vertical reinforcing members that can be weld-joined by any suitable one of various welding methods without affecting the outer panel and the appearance. Specifically, the reinforcing members are not welded to and not in contact with the outer panel while they are arranged in a separating state with respect to the outer panel. Therefore, the strength to resist out-of-plane deformation caused by the in-plane shear force in the outer panel can be improved.

For this purpose, preferably, the horizontal frame members have a hat-shaped cross-section and include flanges on both sides thereof that are weld-joined to the outer panel. In addition, preferably, the vertical reinforcing member includes a notch that fits a rear portion of the flange of the horizontal frame member. The vertical reinforcing member with the notches is placed on and weld-joined to the flanges of the horizontal frame members.

Other objects and features of the present invention will be apparent from the following detailed description when read in conjunction with the drawings. Each of the features of the present invention may be used alone or in various practicable combinations.

BEST MODE FOR CARRYING OUT THE INVENTION

With reference to FIGS. 1A to 4B, an embodiment of a method for weld-joining attachments to an outer panel of a railway vehicle according to the present invention and an embodiment of a car body side structure produced by the inventive method are specifically described to facilitate understanding of the invention.

In one embodiment, a car body side structure 41 shown in FIGS. 1A to 1D and 2 is produced. Specifically, attachments are weld-joined to a stainless steel-made outer panel 3 shown in FIG. 2. The attachments include: stainless steel-made frame members 1 and 2 vertically and horizontally arranged to reinforce the outer panel 3; and stainless steel-made opening frames and opening frame members 42a and 43a used as exterior members disposed on opening edges for an entrance door 42 and a window 43. However, the present invention is not limited to the above embodiment and is applicable to any car body structure including an outer panel of a railway vehicle and attachments weld-joined to the outer panel. In addition, the material is not particularly limited to stainless steel.

Figure 1A:
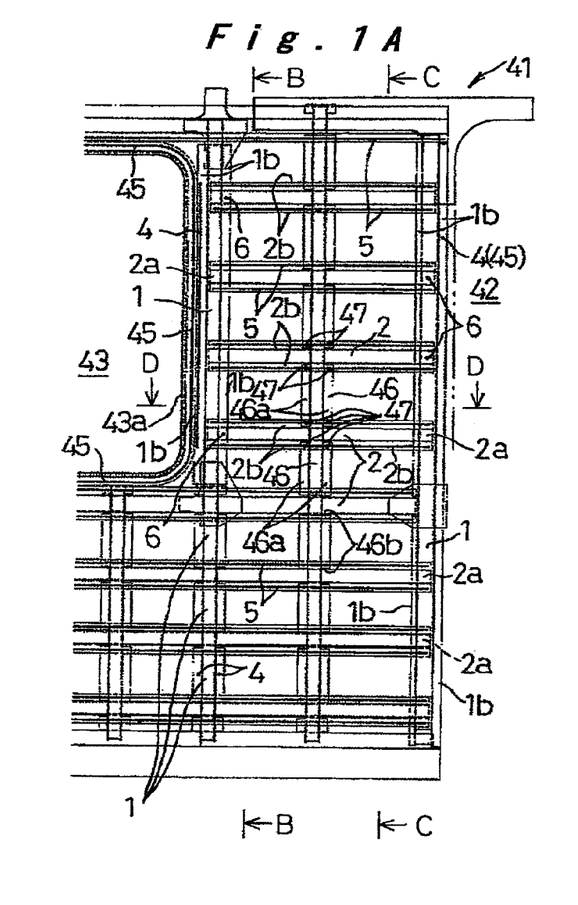
FIGS. 1A to 1D show an example of the joining structure between an outer panel, vertically and horizontally arranged frame members, opening frames, and opening frame members, the joining structure being used in a car body side structure of a railway vehicle according to an embodiment of the present invention, FIG. 1A being a front view from the inner side, FIG. 1B being a cross-sectional view taken along line B-B in FIG. 1A, FIG. 10 being a cross-sectional view taken along line C-C in FIG. 1A, FIG. 1D being an enlarged view of area E in FIG. 1C.
Figure 1B:
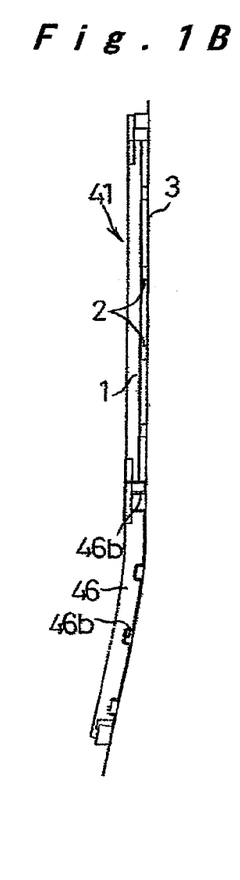
Figures 1C, 1D:
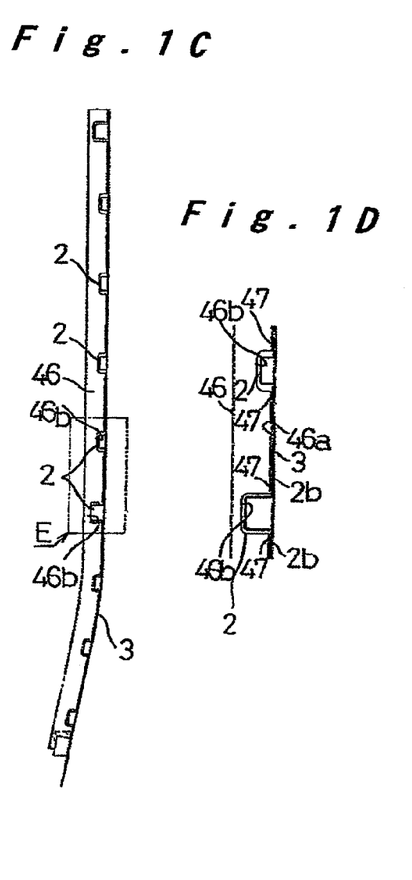
Figure 2:
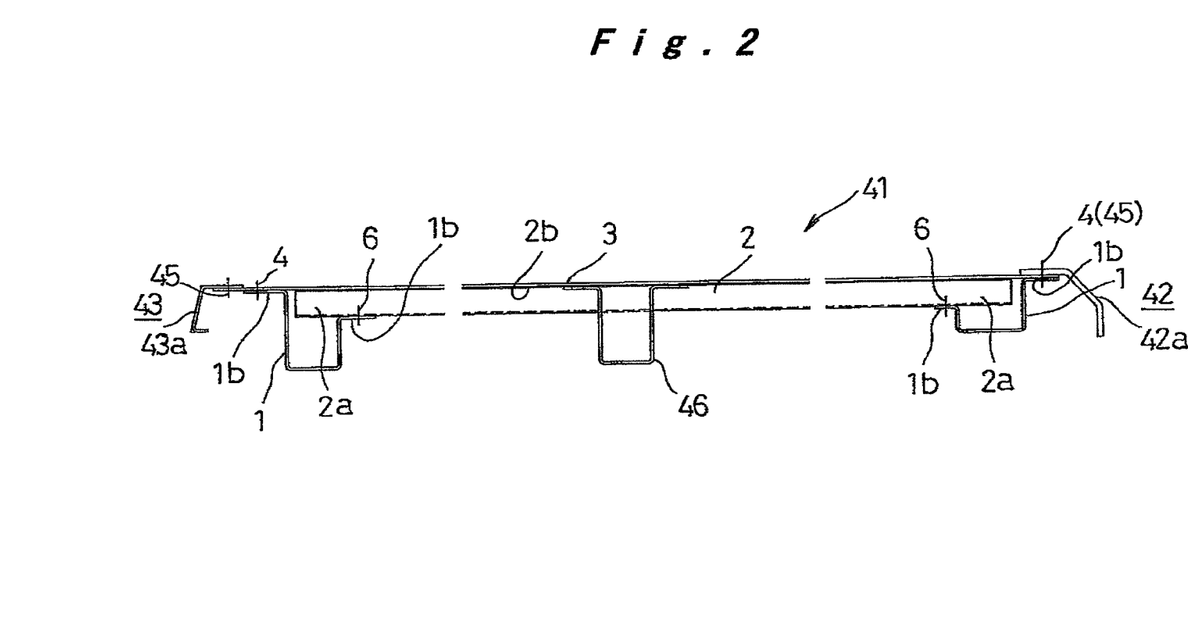
FIG. 2 is a horizontal cross-sectional view between the window and the entrance door of the car body side structure in FIG. 1A.

As shown in FIG. 2, the frame members 1 and 2, being the attachments, are placed on the interior surface of the outer panel 3 and weld-joined such that the outer panel 3 is disposed on the exterior side. The opening frame and opening frame member 42a and 43a, being the attachments, are placed on the exterior surface of the outer panel 3 and weld-joined such that the opening frame and opening frame member 42a and 43a are disposed on the exterior side. As described above, in the present embodiment, the attachments including the frame members 1 and 2 and the opening frame and opening frame member 42a and 43a, which are reinforcements or as interior and exterior members for use in the outer panel, are weld-joined to the outer panel 3 at weld-joining portions 4, 5, and 45 shown in FIGS. 1A and 2. More specifically, the attachments including the frame members 1 and 2 and the opening frame and opening frame member 42a and 43a are placed on and weld-joined to the outer panel 3 at their overlapping portions by laser welding performed along polishing marks formed in one direction on the externally exposed-side surfaces of the outer panel 3 and the attachments 1, 2, 42a, and 43a. A YAG laser beam is suitable for the laser beam used for stainless steel. However, the laser beam is not limited thereto.

As described above, the attachments including the frame members 1 and 2 and the opening frame and opening frame member 42a and 43a are placed on and weld-joined to the outer panel 3 at their overlapping portions by laser welding from the interior side. In this case, the laser welding is performed along the polishing marks formed in one direction on the exterior-side surfaces of the outer panel 3 and the attachments 1, 2, 42a, and 43a. Therefore, the formation of noticeable linear marks in the laser welding direction on the exterior surfaces can be avoided, and laser welding for weld-joining the attachments including the frame members 1 and 2 and the opening frame and opening frame member 42a and 43a to the outer panel 3 can be put to practical use. In this manner, the laser welding lines are formed along the polishing marks on the exterior-side surfaces. Therefore, the formation of noticeable linear marks in the laser welding direction on the exterior surfaces can be avoided. Since laser welding can be performed without deterioration of appearance, the workability is improved accordingly, and the cost is also reduced. Preferably, in terms of the joining strength and the appearance of the outer panel 3, the depth of penetration t into the outer panel 3 during laser welding is 0.1 mm to about 50% of the thickness of the outer panel 3.

In the present embodiment, the outer panel 3 used has polishing marks formed in the lengthwise direction of the vehicle, and the frame members 2 are horizontally placed on the interior surface of the outer panel 3 as shown in FIGS. 1A and 2 and are joined thereto by laser welding at the weld-joining portions 5 continuous in the lengthwise direction of the frame members 2. Since the direction of the polishing marks on the outer panel 3 is set to the lengthwise direction of the vehicle, a large number of long horizontal frame members 2 can be used as shown in FIG. 1A and can be continuously laser welded. This contributes to the required car body strength. In other words, the ratio of the number of long horizontal frame members 2 is increased, and the ratio of the continuously laser welded portions is also increased. This is further advantageous in terms of workability and cost reduction and contributes to the required car body strength.

Meanwhile, the frame members 1 vertically placed on the interior surface of the outer panel 3 are weld-joined to the outer panel 3 at the weld-joining portions 4 by spot welding as shown in FIG. 1a. Linear marks are formed when laser welding is performed along the vertical frame members 1. Since spot welding is used to weld-join the vertical frame members 1 to the outer panel 3 having the polishing marks formed in the lengthwise direction of the vehicle, the formation of noticeable linear marks intersecting the polishing marks can be avoided. In this manner, the number of the vertical frame members 1 can be reduced by an amount that corresponds to the increase in the number of the horizontal frame members 2. Even in such a case, the required car body strength can be ensured.

The vertical frame members 1 and the horizontal frame members 2 are weld-joined at the weld-joining portions 6 by any of plug welding, spot welding, and laser welding. Since any suitable one of various welding methods can be used, the vertical and horizontal frame members 1 and 2 can be weld-joined together without affecting the outer panel 3 and the appearance, and the joint strength between the frame members 1 and 2 can be improved.

With the above method for weld-joining the attachment to the outer panel, the outer panel 3 having the polishing marks formed in the lengthwise direction of the vehicle and the frame members 2 horizontally placed on the interior surface of the outer panel 3 are joined at the weld-joining portions 5 welded by laser welding performed in the lengthwise direction of the frame members 2. The outer panel 3 and the frame members 1 vertically placed on the interior surface of the outer panel 3 are joined at the weld-joining portions 4 welded by spot welding. Moreover, the opening frame and opening frame member 42a and 43a are placed on the exterior surfaces of the opening edges of the outer panel 3, which are provided for the entrance door 42 and the window 43, and are joined to the outer panel 3 at the weld-joining portions 45 welded by laser welding performed in the lengthwise directions of the opening frame and opening frame member 42a and 43a. In this manner, the car body side structure 41 of a railway vehicle is obtained. The opening frame and opening frame member 42a and 43a have polishing marks formed in their lengthwise directions on the exterior surfaces, i.e., along their peripheries. Therefore, the advantageous features of the above method are effectively utilized, and sufficient car body strength can be ensured at low cost while the appearance is not impaired. In the standard procedure for producing the car body side structure 41, an outer panel 3 having a size corresponding to the distance between the entrance doors 42 and including an opening for the window 43 is used, and the opening frame 43*a* is placed on and weld-joined to the exterior-side edge of the opening for the window 43. Subsequently, the vertical and horizontal frame members 1 and 2 are placed on and weld-joined to the interior surface of the outer panel 3, and reinforcing members 46 are placed on and weld-joined to the horizontal frame members 2. A plurality of such outer panels 3 are separately produced. Then, the opening frame members 42*a* are placed on and weld-joined to the edges of the openings for the entrance doors, whereby the outer panels 3 are joined together so as to have a length corresponding to the length of one vehicle.

In the car body side structure 41 shown in FIGS. 1A to 1D and 2, the horizontal frame members 2 are disposed at substantially regular vertical intervals on the interior surface of the outer panel 3 except for the openings for the window 43 and the entrance doors 42, in particular, as shown in FIGS. 1A to 1D. The vertical frame members 1 are disposed along the side portions of the openings for the window 43 and the entrance doors 42 and along the edge portions (not shown) of the outer panel 3. Between the vertical frame members 1, the vertical reinforcing members 46 are placed on the horizontal frame members 2 from the interior side so as to extend therebetween and are joined thereto at weld-joining portions 47 welded by any of plug welding, spot welding, and laser welding. In areas where the horizontal frame members 2 can be disposed, a higher priority is given to the horizontal frame members 2 than to the vertical frame members 1, so that the number of the horizontal frame members 2 disposed in those areas is greater than the number of the vertical frame members 1. In this manner, the horizontal frame members 2 are prevented from being divided by the vertical frame members 1, and the continuity of laser welding is maintained. Therefore, the required car body strength can be ensured by the vertical frame members 1 significantly reduced in their number and by the vertical reinforcing members 46 that can be weld-joined by any suitable one of various welding methods without affecting the outer panel 3 and the appearance. Specifically, the reinforcing members are not welded to and not in contact with the outer panel while they are arranged in a separating state with respect to the outer panel. Therefore, the strength to resist out-of-plane deformation caused by the in-plane shear force in the outer panel can be improved. For this purpose, the structures shown in the figures are preferred. More specifically, in such structures, the horizontal frame members 2 have a hat-shaped cross-section, and the flanges 2*b* on both sides are weld-joined to the outer panel 3. In addition, each vertical reinforcing member 46 has a hat-shaped cross-section and includes flanges 46*a* and notches 46*b* that fit the rear portions of the flanges 2*b* of the horizontal frame members 2. The vertical reinforcing member 46 is weld-joined to the flanges 2*b* of the horizontal frame members 2 with the flanges 46*a* abutting against the flanges 2*b*.

In areas where the vertical frame members 1 interfere with the horizontal frame members 2 having a higher priority for continuous placement, the vertical frame members 1 are disposed in a divided manner. However, since the vertical frame members 1 are spot-welded to the outer panel 3 in a discontinuous manner, the workability is not particularly affected.

Figure 3:
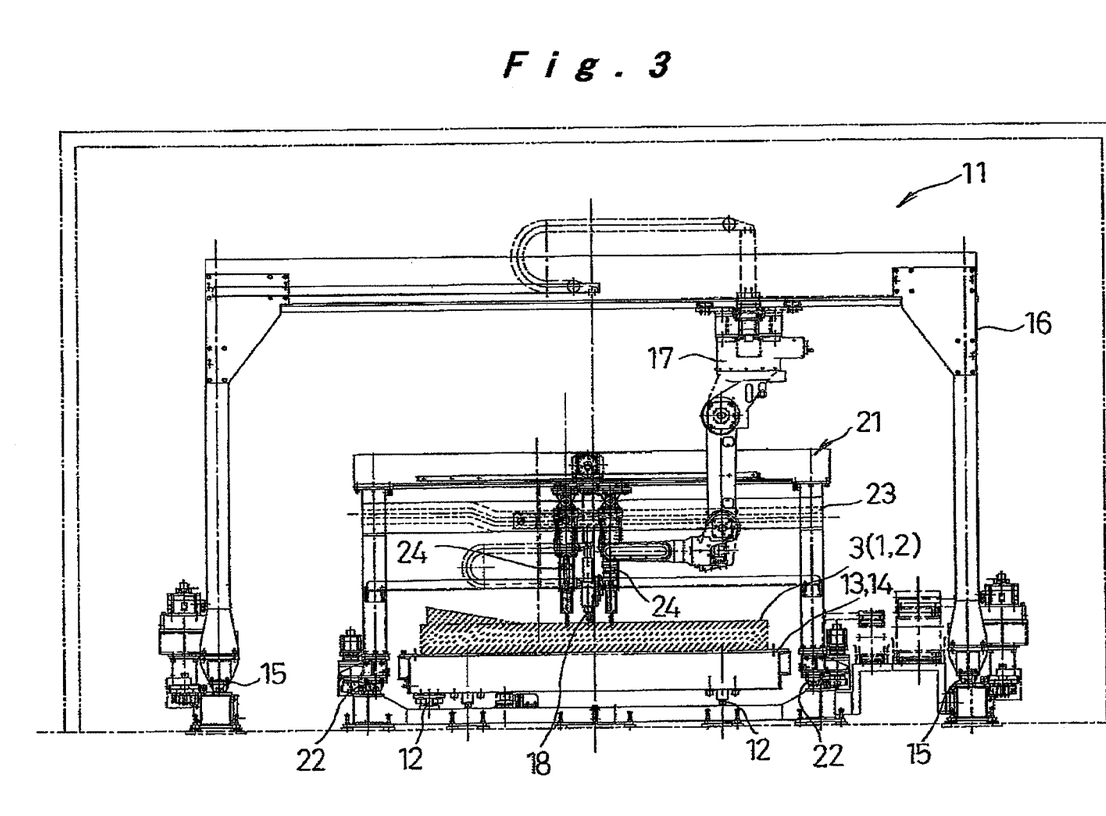
FIG. 3 is a horizontal cross-sectional view illustrating a laser welding facility used for welding of the weld-joining portions in the embodiment.
Figure 4A:
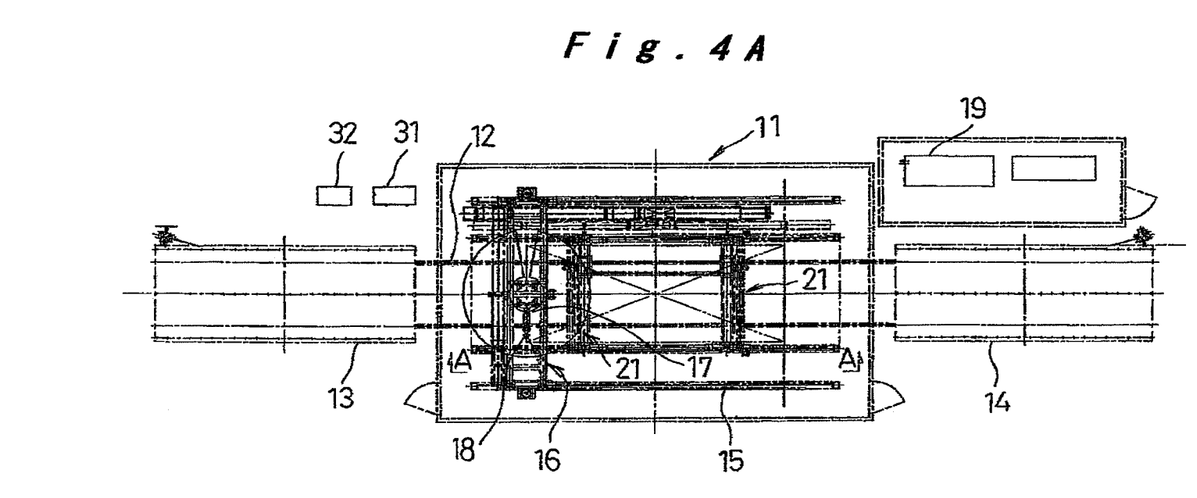
FIGS. 4A and 4B show the laser welding facility shown in FIG. 3, FIG. 4A being a plan view, FIG. 4B being a front view.
Figure 4B:
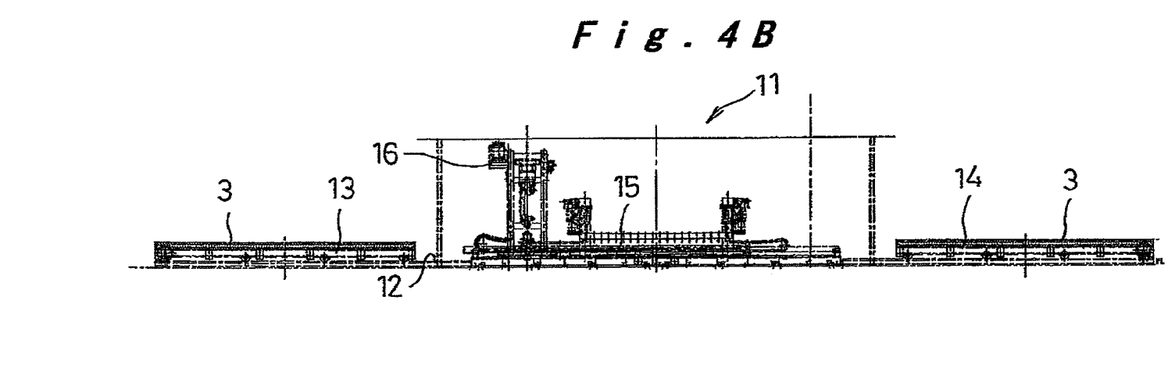

The laser welding described above is performed using, for example, a laser welding facility shown in FIGS. 3, 4A, and 4B. As shown in FIGS. 4A and 4B, this laser welding facility includes a welding operation unit 11 and left and right jig trucks 13 and 14 that travel on rails 12 extending across the welding operation unit 11 in the left and right directions. Each of the left and right jig trucks 13 holds an outer panel 3 that forms a car body structure of a vehicle such as the car body side, roof, or end. The left and right jig trucks 13 and 14 enter the welding operation unit 11 in an alternate manner to laser-weld the held outer panel 3 to frame members 1 and 2 to be vertically and horizontally arranged thereon, and this procedure is repeated. Every time the left and right jig trucks 13 and 14 exit from the welding operation unit 11, the welded car body structure placed thereon is replaced with a new outer panel 3. The welding operation unit 11 includes a gate-shaped operation leg 16 that travels on rails 15. The operation leg 16 supports an articulated robot 17 having, for example, about five joints. The frame members 1 and 2 to be vertically and horizontally arranged are laser welded to the outer panel 3 placed on the jig truck 13 entering the welding operation unit 11 through the use of the articulated robot 17. As shown in FIG. 3, the articulated robot 17 is provided with a laser torch 18 for laser welding disposed at the end portion of the robot arm. The laser torch 18 supplies a laser beam from a laser oscillating device 19 provided with a cooling mechanism through an optical fiber, and the weld-joining portions are irradiated with the laser beam to perform laser welding in a predetermined manner. The welding operation unit 11 further includes two pressurizing mechanisms 21 for laser welding on the left and right sides thereof. The pressurizing mechanisms 21 apply downward pressure to the outer panel placed on the jig truck 13 or 14 entering the welding operation unit 11 and to the frame members 1 and 2 to be vertically and horizontally arranged on the outer panel and support them in predetermined positions for laser welding. Each of the left and right pressurizing mechanisms 21 includes a pair of pressurizing rods 24 supported by a gate-shaped supporting leg 23 traveling on rails 22, and the pressurizing and supporting operation is performed using the left and right pairs of pressurizing rods 24. The laser welding operation is controlled by a robot control unit 31 and a jig control unit 32 that are operated cooperatively.

As shown in FIGS. 1A and 2, the vertically and horizontally arranged first and second frame members 1 and 2 are weld-joined to the outer panel 3 with an end portion 2*a* of each second frame member 2 facing a side surface of a corresponding one of the first frame members 1. To reinforce the outer panel 3, each first frame member 1 is placed in a straddling manner on the outer panel 3 and the end portions 2*a* of the second frame members 2 weld-joined to the outer panel 3 at the weld-joining portions 5 and is weld-joined to both the second frame members 2 and the outer panel 3 at the weld-joining portions 6 and 4 in the manner shown in FIG. 2. As described above, each first frame member 1 is placed in a straddling manner on the outer panel 3 and the end portions 2*a* of the second frame members 2 weld-joined to the outer panel 3 and is weld-joined to both the second frame members 2 and the outer panel 3. Therefore, the entire end portion 2*a* of each second frame member 2 has a structure that is to be weld-joined to the outer panel 3 and is disposed below the first frame member 1 in an overlapping manner while the three-dimensional structural shapes of both the frame members utilizing the material and structural characteristics are maintained. This entire end portion 2*a* of the second frame member 2 is also weld-joined to the first frame member 1 weld-joined to the outer panel 3. Furthermore, the horizontal frame members 2 can be continuously laser welded to the outer panel 3. In this manner, the concentration of stress on the end portion 2*a* of the second frame member 2 can be prevented while the joint strength between the vertically and horizontally arranged first and second frame members 1 and 2 is improved.

More specifically, as shown in FIGS. 1A to 1D and 2, each second frame member 2 has a hat-shaped cross-section, and the flanges 2b on both sides of the second frame member 2 are placed on and weld-joined to the outer panel 3 by laser welding. As shown in the example in FIGS. 1A and 2, each first frame member 1 has a hat-shaped cross-section and includes flanges 1b on both sides thereof. The first frame member 1 is disposed in a straddling manner on the outer panel 3 and the end portions 2a of the second frame members 2. More specifically, one of the flanges 1b is placed on and weld-joined to the end portions 2a of the second frame members 2 by any of laser welding, spot welding, and the plug welding described above, and the other flange 1b is placed on and weld-joined to the outer panel 3 by laser welding. With this configuration, the vertically and horizontally arranged frame members 1 and 2 can be joined to the outer panel 3 by laser welding. In addition, the vertically and horizontally arranged frame members 1 and 2 are mutually joined and joined to the outer panel in an improved manner, and the joint strength and the joining strength can be improved by effectively utilizing the mechanical shapes of the frame members 1 and 2.

In railway vehicles, the outer panel 3 is often reinforced by the long horizontal frame members 2 extending in the lengthwise direction, as in the car body side structure 41 shown in FIGS. 1A and 2. In such a case, the vertical frame members 1 disposed along the openings for the window 43 and the entrance doors 42 have side surfaces facing the end portions 2a of a large number of horizontal frame members. Therefore, the joint strength between these frame members and the joining strength between the outer panel 3 and these frame members are important issues. To improve the joint strength and the joining strength, the specific example shown in FIGS. 1A to 1D and 2 is effective. In addition, the laser weld-joined portions 4 continuous along the openings for the window 43 and the entrance doors 42 preferably serves as a waterproof measure to prevent rainwater from entering through the openings. As shown in FIG. 2, the vertical frame members 1 disposed along the openings for the window 43 and the entrance door 42 are independent of the opening frame and opening frame member 42a and 43a disposed in the openings for the window 43 and the entrance doors 42. For example, if the opening frame member 43a, the frame member 1, and the outer panel 3 are laser welded together at their three-layer overlapping portion, the laser welding takes a long time. However, since the opening frame member 43a and the frame member 1 are laser welded to the outer panel 3 in an independent manner, the above problem can be avoided. In this case, the laser welding line of the frame member 1 adjacent to the opening frame member 43a is noticeable since the laser welding line is orthogonal to the polishing marks on the outer panel 3 that are formed in the lengthwise direction of the vehicle. However, this laser welding line can be covered and hidden by the opening frame member 43a that is placed on the exterior surface of the outer panel 3 and laser welded from the inner side. Even when not covered and hidden, the laser welding line can be less noticeable by placing it near the edge of the opening frame member 43a. Since an enough space is not provided, the opening frame member 42a and the frame member 1 are laser welded to the outer panel 3 from the interior side with the three members overlapping with each other. However, to simplify the joining, spot welding may be used. The frame members 1 and the opening frame and opening frame member 42a and 43a may be formed integrally and used as an integrated member. Also in this manner, the joint strength and the joining strength can be improved.

INDUSTRIAL APPLICABILITY

In the present invention, the outer panels of a railway vehicle can be joined to frame members, opening frames, opening frame members, and other members by laser welding without deterioration of the appearance. Therefore, the present invention is advantageous in terms of welding workability, cost, strength, appearance, and the like.

The invention claimed is:

1. A method for weld-joining an attachment to an outer panel of a railway vehicle, the method comprising:
    providing the outer panel having a polishing mark formed in one direction on an exterior surface of the outer panel;
    providing the attachment as at least one of a reinforcement, an interior member, and exterior member for use in the outer panel, the attachment including a frame member, an opening frame, and an opening frame member; and
    placing the attachment on an interior surface of the outer panel such that at least a portion of the outer panel and a portion of the attachment overlap with each other to form an overlapping portion, and laser welding, from the interior surface, the outer panel and the attachment together at the overlapping portion and along the polishing mark of the outer panel.

2. The method according to claim 1, wherein one of the opening frame and the opening frame member is placed on an external surface of an opening edge of the outer panel, and the outer panel and the one of the opening frame and the opening frame member are weld-joined by laser welding in a lengthwise direction of the one of the opening frame and the opening frame member.

3. The method according to claim 1, wherein the polishing mark on the outer panel is formed in a lengthwise direction of the vehicle, and the frame member is horizontally placed on an interior surface of the outer panel so that the outer panel and the frame member are weld-joined by laser welding in a lengthwise direction of the frame member.

4. The method according to claim 3, wherein the outer panel and the opening frame or the opening frame member placed on an exterior surface of an opening edge of the outer panel are weld-joined by laser welding in a lengthwise direction of the opening frame or the opening frame member.

5. The method according to claim 3, wherein the frame member includes a vertical frame member vertically placed on the interior surface of the outer panel, and the outer panel and the vertical frame member are weld-joined by spot welding.

6. The method according to claim 5, wherein the vertical frame member and the horizontal frame member are weld-joined together by any of plug welding, spot welding, and laser welding.

7. The method according to claim 5, wherein the outer panel and the opening frame or the opening frame member placed on an exterior surface of an opening edge of the outer panel are weld-joined by laser welding in a lengthwise direction of the opening frame or the opening frame member.

8. A car body side structure of a railway vehicle, comprising:
    an outer panel, a vertical frame member and a horizontal frame member, and one of an opening frame and an opening frame member, the vertical frame member and the horizontal frame member being placed on an interior surface of the outer panel, the outer panel being weld-joined to the vertical frame member, the horizontal frame member, and the one of the opening frame and the opening frame member, wherein
    the outer panel has a polishing mark formed in a lengthwise direction of the vehicle, the outer panel being joined to the horizontal frame member at a weld-joining portion that is laser welded at the interior surface of the outer panel and along the polishing mark in a lengthwise direction of the horizontal frame member, the outer panel is joined to the vertical frame member at a weld joining portion welded by spot welding, and the one of the opening frame and the opening frame member has a lengthwise polishing mark formed on an exterior surface thereof and is placed on an exterior surface of an opening edge of the outer panel, the outer panel and the one of the opening frame and the opening frame member being joined at a weld joining portion welded by laser welding performed in a lengthwise direction of the one of the opening frame and the opening frame member.

9. The car body side structure of a railway vehicle according to claim 8, wherein the outer panel, the frame member, and the one of the opening frame and the opening frame member are made of stainless steel.

10. The car body side structure of a railway vehicle according to claim 8, further comprising:

the outer panel including an opening for a window and an opening for an entrance door;

the horizontal frame members are disposed at substantially regular vertical intervals on the interior surface of the outer panel except for the openings for the window and the entrance door;

the vertical frame members are disposed along side portions of the openings for the window and the entrance door and along an end portion of the outer panel; and between the vertical frame members, a vertical reinforcing member is placed on the horizontal frame members from an interior side so as to extend therebetween and is joined thereto at weld-joining portions welded by any of plug welding, spot welding, and laser welding.

11. The car body side structure of a railway vehicle according to claim 10, wherein the outer panel, the frame members, and the one of the opening frame and the opening frame member are made of stainless steel.

12. The car body side structure of a railway vehicle according to claim 8, wherein the vertical frame member and the horizontal frame member are weld-joined at a weld-joining portion together by any of plug welding, spot welding, and laser welding.

13. The car body side structure of a railway vehicle according to claim 12, wherein the outer panel, the frame members, and the one of the opening frame and the opening frame member are made of stainless steel.

14. The car body side structure of a railway vehicle according to claim 12, wherein: the outer panel includes an opening for a window and an opening for an entrance door; the horizontal frame members are disposed at substantially regular vertical intervals on the interior surface of the outer panel except for the openings for the window and the entrance door; the vertical frame members are disposed along side portions of the openings for the window and the entrance door and along an end portion of the outer panel; and between the vertical frame member, a vertical reinforcing member is placed on the horizontal frame members from an interior side so as to extend therebetween and is joined thereto at weld-joining portions welded by any of plug welding, spot welding, and laser welding.

15. The car body side structure of a railway vehicle according to claim 10, wherein the horizontal frame members have a hat-shaped cross-section and include flanges on both sides thereof that are weld-joined to the outer panel; and the vertical reinforcing member includes a notch that fits a rear portion of the flange of the horizontal frame member and the vertical reinforcing member is placed on and weld-joined to the flanges of the horizontal frame members.

16. The car body side structure of a railway vehicle according to claim 15, wherein the outer panel, the frame members, and the one of the opening frame and the opening frame member are made of stainless steel.

* * * * *